United States Patent
Wagner et al.

(10) Patent No.: US 8,215,464 B2
(45) Date of Patent: Jul. 10, 2012

(54) HYDRAULIC UNIT

(75) Inventors: Axel Wagner, Schlüchtern (DE); Martin Baechle, Glashütten 1 (DE); Michael Hitzel, Rödermark (DE)

(73) Assignee: Contential Teves AG & Co. oHG (DE)

( * ) Notice: Subject to any disclaimer, the term of this patent is extended or adjusted under 35 U.S.C. 154(b) by 237 days.

(21) Appl. No.: 12/705,722

(22) Filed: Feb. 15, 2010

(65) Prior Publication Data

US 2010/0213757 A1    Aug. 26, 2010

(30) Foreign Application Priority Data

Feb. 21, 2009    (DE) .......................... 10 2009 010 050

(51) Int. Cl.
 *B60T 17/04* (2006.01)

(52) U.S. Cl. .......................... 188/352; 303/10; 303/113.2

(58) Field of Classification Search .................. 303/84.2, 303/DIG. 10, DIG. 11, 10, 113.1, 113.2; 188/345, 352, 358

See application file for complete search history.

(56) References Cited

U.S. PATENT DOCUMENTS

| | | | | |
|---|---|---|---|---|
| 5,505,529 A | * | 4/1996 | Siegel et al. | 303/116.1 |
| 5,605,384 A | * | 2/1997 | Johnston et al. | 303/113.1 |
| 5,944,068 A | | 8/1999 | Hool | |
| 6,199,958 B1 | | 3/2001 | Baechle | |
| 6,199,961 B1 | * | 3/2001 | Beck | 303/116.1 |
| 6,398,317 B1 | * | 6/2002 | Burgdorf et al. | 303/116.2 |
| 6,550,872 B1 | * | 4/2003 | Caldwell | 303/84.2 |

FOREIGN PATENT DOCUMENTS

DE    44 46 525    6/1996
EP    0 950 004    10/1999

OTHER PUBLICATIONS

German Search Report for DE 10 2009 010 050.4 dated Oct. 28, 2009.

* cited by examiner

*Primary Examiner* — Christopher Schwartz
(74) *Attorney, Agent, or Firm* — RatnerPrestia

(57) ABSTRACT

A hydraulic unit for a motor vehicle brake system operating on the recirculation principle, in which each brake circuit has in the region of the hydraulic unit a prefilling location which opens into the pump suction conduit between the pressure-retaining valve and the change-over valve for the purpose of receiving brake fluid. The hydraulic unit can thereby be pre-filled with lower complexity and cost in terms of time and processes prior to installation in the vehicle.

11 Claims, 1 Drawing Sheet

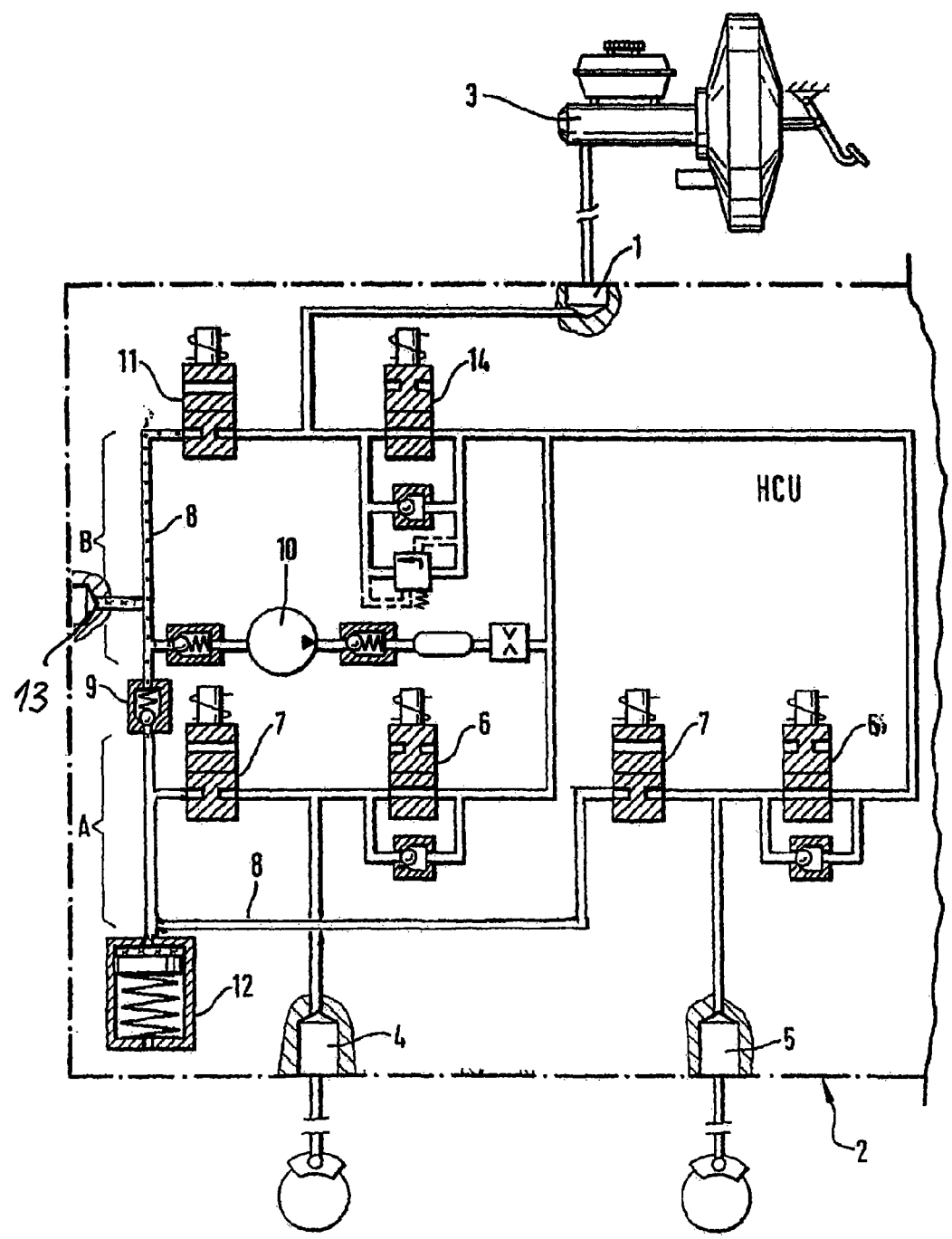

HYDRAULIC UNIT

CROSS-REFERENCE TO RELATED APPLICATIONS

This application claims priority to German Patent Application No. DE 10 2009 010 050.4 filed Feb. 21, 2009, the contents of such application being incorporated by reference herein in its entirety.

FIELD OF THE INVENTION

The invention relates to a hydraulic unit and to a method for the bubble-free filling of a hydraulic unit with brake fluid.

BACKGROUND OF THE INVENTION

Hydraulic units of the aforementioned type are either prefilled with brake fluid by the brake manufacturer or made available in the unfilled state to the vehicle producer. Because, in the case of motor vehicle brake systems operating on the recirculation principle, the wheel outlet valves lead into so-called secondary circuits which contain the entire pump suction conduit with the low-pressure accumulator, the pressure-retaining valve and the change-over valve, special venting and filling measures are needed in order also to protect the region of the secondary circuit separated by electrically and hydraulically switchable valves from air inclusions in an operatively safe manner and to fill same with brake fluid.

In this case it is advantageous for the vehicle producer if the process of filling the entire brake system is restricted solely to the primary circuit, that is, to the hydraulic section between the braking pressure generator and the pressure medium connection opened in the direction of the wheel brake. For this reason the essential functional components combined to form a hydraulic unit are often made available to the vehicle producer in a prefilled state by the brake system manufacturer.

A suitable approach to solving this problem is known from the patent EP 0 950 004 B1, which is incorporated by reference. In this patent it is proposed to provide a prefilling location between the pressure-retaining valve and the outlet valves in the pump suction conduit, via which prefilling location evacuation and prefilling of the entire secondary circuit is effected.

SUMMARY OF THE INVENTION

It is now an object of the invention to prepare a hydraulic unit of the type specified in such a manner that a prefilling of the hydraulic unit as simple as possible by the brake manufacturer, and simple putting into operation by the vehicle producer, are achieved with low complexity and cost in terms of time, construction and functions.

Further features and advantages of the invention are apparent from the description of an exemplary embodiment which follows.

BRIEF DESCRIPTION OF THE DRAWING

FIG. 1 shows in a schematic representation the circuit structure within a hydraulic unit for a motor vehicle brake system operating on the recirculation principle.

DETAILED DESCRIPTION OF THE INVENTION

FIG. 1 shows in a schematic representation the circuit structure within a hydraulic unit for a motor vehicle brake system operating on the recirculation principle. In this case only one brake circuit of a circuit arrangement normally configured as a dual-circuit system is shown. A first pressure connection 1 on the hydraulic unit 2 leads to a braking pressure generator 3, while the first connection 1 leads inside the hydraulic unit 2, via a plurality of pressure control valves of each brake circuit, which are illustrated at least in part in the hydraulic unit 2, to further, second and third connections 4, 5 which are connected to a pair of wheel brakes. Associated with each wheel brake within the hydraulic unit are two inlet and outlet valves 6, 7, a pump suction conduit 8 being connected downstream of the outlet valves 7 of each brake circuit, which pump suction conduit 8 is separated from the braking pressure generator 3 via a pressure-retaining valve 9, on one side by means of a pump 10 and on the other by means of a change-over valve 11 which is closed in its normal position. As a result of the pressure-retaining valve 9, therefore, the pump suction conduit 8 is subdivided into two conduit sections A, B, the conduit section A, which extends between the pressure-retaining valve 9 and to each outlet valve 7, being enlarged by the connection of the low-pressure accumulator 12. The two conduit sections A, B form with the connection of the low-pressure accumulator 12 the so-called secondary circuit of the brake system which is present for each individual brake circuit.

In the case of the present configuration of the electromagnetically actuatable pressure control valves, the inlet valves 6 and also the solenoid valve 14 in the form of an ASR separating valve are open in the normal, unenergized position. The valve arrangement illustrated for a brake circuit therefore corresponds, with regard to the use of the solenoid valve 14 and in conjunction with the arrangement of the electrically actuatable change-over valve 11, to a brake system which is suitable not only for antilock control but also for operation with traction control and vehicle dynamic control. The brake system according to the illustration therefore corresponds in all essential elements to the brake system according to DE 44 46 525 A1, which is incorporated by reference.

For the purpose of receiving brake fluid in the secondary circuit, and therefore in the region of the pump suction conduit 8, the invention provides that each brake circuit has a prefilling location 13 which, after evacuation of the secondary circuit, makes possible prefilling of the secondary circuit by the brake manufacturer, so that, after subsequent completion of the hydraulic unit by the vehicle producer via the three connections 1, 4, 5 to which the wheel brakes and the braking pressure generator 3 are connected, it is necessary only for the so-called primary circuit to be filled with brake fluid by the vehicle producer, so that the normally closed outlet valves 7 and the change-over valve 11 no longer need to be electrically opened during the filling process.

In this case it is of major importance that the prefilling location 13 opens into the pump suction conduit 8 between the pressure-retaining valve 9 and change-over valve 11. This is because, in the practical implementation of the pump suction conduit 8 within the complex drilling of the hydraulic unit, the volumetric capacity of the pump suction conduit 8 is generally greater in the conduit section B between the pressure-retaining valve 9 and the change-over valve 11 than in the further conduit section A of the pump suction conduit 8 located between the pressure-retaining valve 9, the low-pressure accumulator 12 and the outlet valves 7.

This has the consequence that the hydraulic unit is evacuated between the pressure-retaining valve 9 and the change-over valve 11 (conduit section B) via the prefilling location 13, is prefilled with brake fluid and the prefilling location 13 is delivered by the brake manufacturer to the vehicle producer in the closed state, so that only the braking pressure generator 3 and the wheel brakes have to be connected to the pressure medium connections 1, 4, 5 of the hydraulic unit by the vehicle producer, in order then to evacuate and fill the primary circuit.

The conduit section A of the hydraulic unit located between the pressure-retaining valve 9, the low-pressure accumulator 12 and the outlet valves 7 therefore initially remains unfilled with brake fluid until the connection of the pressure medium connections 1, 4, 5 to the braking pressure generator 3 and the wheel brakes is established by the vehicle producer.

It is only through the connection of the hydraulic unit to the wheel brakes and the braking pressure generator 3 by the vehicle producer that the hydraulic connection of the brake circuit (primary circuit) present between the first, second and third pressure medium connections 1, 4, 5 is filled with degassed and undersaturated brake fluid in order to take up air inclusions from the conduit section A of the pump suction conduit 8 located between the pressure-retaining valve 9, the low-pressure accumulator 12 and the outlet valves 7. As a rule, the hydraulic connection of the brake circuit (primary circuit) existing between the first, second and third pressure medium connections 1, 4, 5 is evacuated before being filled with brake fluid.

After the pressure medium connections 1, 4, 5 of the hydraulic unit have been connected to the braking pressure generator 3 and the wheel brakes, the conduit section A of the pump suction conduit 8 located between the pressure-retaining valve 9, the low-pressure accumulator 12 and the outlet valves 7 is degassed by the vehicle producer by means of a flushing process and filled with the brake fluid which is removed proportionally from the brake circuit running between the three pressure medium connections 1, 4, 5.

During the flushing process the outlet valves 7 are opened, the pump 10 is put into operation and the braking pressure generator 3 is actuated, so that the brake fluid removed proportionally from the primary circuit and supplied to the conduit section A can be replaced from the braking pressure generator 3.

To sum up, therefore, for the bubble-free filling of the hydraulic unit with brake fluid the pump suction conduit 8 between the pressure-retaining valve 9 and the change-over valve 11 is first evacuated via the prefilling location 13, is prefilled with brake fluid and then is closed at the prefilling location 13 by the brake manufacturer in a first process step.

As a second process step, two pressure medium connections of the three pressure medium connections 1, 4, 5 on the hydraulic unit 2 are closed in a pressure-medium tight manner by the vehicle producer, the brake circuit being evacuated via the pressure medium connection which is not closed and filled with degassed and undersaturated brake fluid, and then closed.

Then, in a third process step, the conduit section A of the pump suction conduit 8 located between the pressure-retaining valve 9, the low-pressure accumulator 12 and the outlet valves 7 is degassed by means of a flushing process and filled with brake fluid which is removed proportionally from the brake circuit (primary circuit) running between the three pressure medium connections 1, 4, 5, the outlet valves 7 being opened, the braking pressure generator 3 being actuated and the pump 10 being put into operation in order to carry out the flushing process. After the air inclusion in the conduit section A has been absorbed by the brake fluid and the secondary circuit has been filled with brake fluid, the flushing process is ended. The brake system is then ready for operation.

What is claimed:

1. Hydraulic unit for a motor vehicle brake system operating on a recirculation principle, said hydraulic unit comprising:
    a first pressure medium connection on the hydraulic unit for a braking pressure generator,
    pressure control valves in the form of inlet and outlet valves in a brake circuit present at least in part in the hydraulic unit, which brake circuit is connected via second and third pressure medium connections on the hydraulic unit to at least one pair of wheel brakes,
    a pump suction conduit arranged in the hydraulic unit downstream of the outlet valves,
    a low-pressure accumulator connected to the pump suction conduit,
    a pressure-retaining valve arranged in the hydraulic unit downstream of the low-pressure accumulator, via which pressure-retaining valve the pump suction conduit on one side is connected to a pump and on the other side is separated from the first pressure medium connection leading to a braking pressure generator via a change-over valve which is closed in a normal position, and
    a prefilling location in each brake circuit which opens into the pump suction conduit for receiving brake fluid,
    wherein the prefilling location opens into the pump suction conduit between the pressure-retaining valve and the change-over valve.

2. Hydraulic unit according to claim 1, wherein a volumetric capacity of the pump suction conduit is greater in a first conduit section between the pressure-retaining valve and the change-over valve than in a second conduit section of the pump suction conduit located between the pressure-retaining valve, the low-pressure accumulator and the outlet valves.

3. Hydraulic unit according to claim 2, wherein, prior to a connection of the pressure medium connections to the braking pressure generator and the wheel brakes, the first conduit section between the pressure-retaining valve and the change-over valve is evacuated via the prefilling location and prefilled with brake fluid, and the prefilling location is closed.

4. Hydraulic unit according to claim 2, wherein, prior to a connection of the pressure medium connections to the braking pressure generator and the wheel brakes, the second conduit section of the pump suction conduit located between the pressure-retaining valve, the low-pressure accumulator and the outlet valves is not prefilled with brake fluid.

5. Hydraulic unit according to claim 1, wherein, after a connection of the pressure medium connections to the braking pressure generator and the wheel brakes, the hydraulic connection of the brake circuit present between the first, second and third pressure medium connections is filled with degassed and undersaturated brake fluid in order to take up air inclusions from a conduit section of the pump suction conduit that is located between the pressure-retaining valve, the low-pressure accumulator and the outlet valves.

6. Hydraulic unit according to claim 5, wherein the hydraulic connection of the brake circuit present between the first, second and third pressure medium connections is evacuated before being filled with brake fluid.

7. Hydraulic unit according to claim 5, wherein, after a connection of the pressure medium connections to the braking pressure generator and the wheel brakes, the conduit section of the pump suction conduit located between the pressure-retaining valve, the low-pressure accumulator and the outlet valves is degassed by means of a flushing process and filled with the brake fluid which is removed proportionally from the brake circuit running between the three pressure medium connections.

8. Hydraulic unit according to claim 7, wherein during the flushing process the outlet valves are opened, the pump is activated and the braking pressure generator is actuated.

9. A method for bubble-free filling of a hydraulic unit with brake fluid, the hydraulic unit comprising:
- a first pressure medium connection on the hydraulic unit for a braking pressure generator,
- pressure control valves in the form of inlet and outlet valves in a brake circuit present at least in part in the hydraulic unit, which brake circuit is connected via second and third pressure medium connections on the hydraulic unit to at least one pair of wheel brakes,
- a pump suction conduit arranged in the hydraulic unit downstream of the outlet valves,
- a low-pressure accumulator connected to the pump suction conduit,
- a pressure-retaining valve arranged in the hydraulic unit downstream of the low-pressure accumulator, via which pressure-retaining valve the pump suction conduit on one side is connected to a pump and on the other side is separated from the first pressure medium connection leading to a braking pressure generator via a change-over valve which is closed in a normal position, and
- a prefilling location in each brake circuit which opens into the pump suction conduit for receiving brake fluid,
- wherein the prefilling location opens into the pump suction conduit between the pressure-retaining valve and the change-over valve, and
- wherein the method comprises
- prior to connection of the hydraulic unit to the wheel brakes and the braking pressure generator, only a conduit section of the pump suction conduit extending between the pressure-retaining valve and the change-over valve is evacuated via the prefilling location, filled with brake fluid from the primary circuit and then closed at the prefilling location.

10. A method for bubble-free filling of a hydraulic unit with brake fluid, the hydraulic unit comprising:
- a first pressure medium connection on the hydraulic unit for a braking pressure generator,
- pressure control valves in the form of inlet and outlet valves in a brake circuit present at least in part in the hydraulic unit, which brake circuit is connected via second and third pressure medium connections on the hydraulic unit to at least one pair of wheel brakes,
- a pump suction conduit arranged in the hydraulic unit downstream of the outlet valves,
- a low-pressure accumulator connected to the pump suction conduit,
- a pressure-retaining valve arranged in the hydraulic unit downstream of the low-pressure accumulator, via which pressure-retaining valve the pump suction conduit on one side is connected to a pump and on the other side is separated from the first pressure medium connection leading to a braking pressure generator via a change-over valve which is closed in a normal position, and
- a prefilling location in each brake circuit which opens into the pump suction conduit for receiving brake fluid,
- wherein the prefilling location opens into the pump suction conduit between the pressure-retaining valve and the change-over valve,
- wherein the method comprises the following process steps:
- evacuating a first section of the pump suction conduit that is located between the pressure-retaining valve and the change-over valve via the prefilling location;
- prefilling the first section of the pump suction conduit with brake fluid;
- closing the first section of the pump suction conduit at the prefilling location;
- closing two pressure medium connections of the three pressure medium connections on the hydraulic unit in a pressure-medium tight manner;
- evacuating the brake circuit;
- filling the brake circuit with degassed and undersaturated brake fluid via a pressure medium connection which is not closed;
- degassing a second conduit section of the pump suction conduit that is located between the pressure-retaining valve, the low-pressure accumulator and the outlet valves by a flushing process; and
- filling the second conduit section of the pump suction conduit with brake fluid which is removed proportionally from the brake circuit running between the three pressure medium connections.

11. Method for bubble-free filling of the hydraulic unit with brake fluid according to claim 10, wherein, in order to carry out the flushing process, the outlet valves are opened, the braking pressure generator is actuated and the pump is activated.

* * * * *